Patented Aug. 10, 1926.

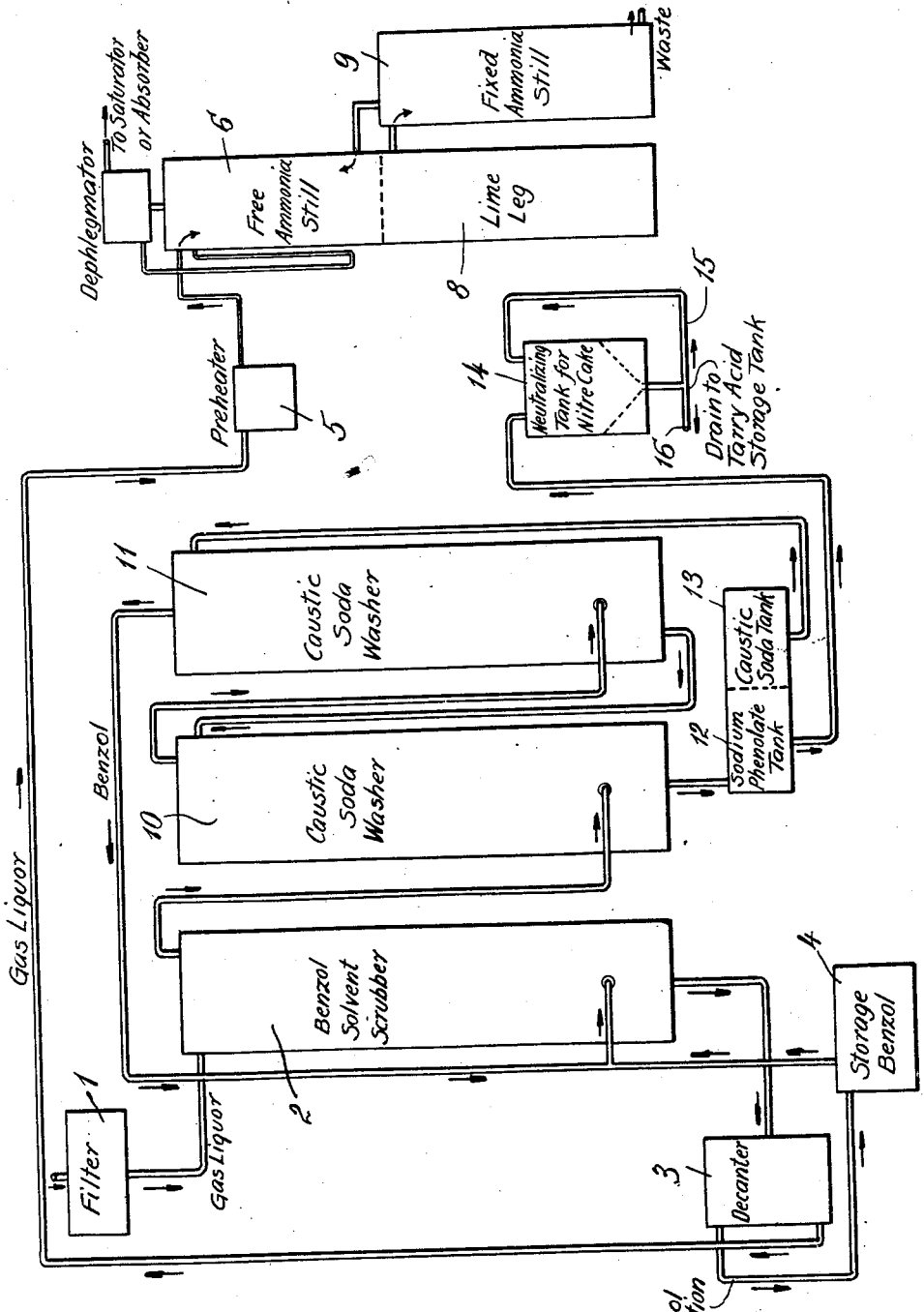

1,595,604

UNITED STATES PATENT OFFICE.

LE ROY WILBUR HEFFNER, OF EAST NORRISTOWN TOWNSHIP, MONTGOMERY COUNTY, AND WILLIAM TIDDY, OF JEFFERSONVILLE, PENNSYLVANIA, ASSIGNORS TO RAINEY-WOOD PROCESS CORPORATION, OF NEW YORK, N. Y., A CORPORATION OF DELAWARE.

TREATMENT OF GAS LIQUOR.

Application filed January 21, 1926. Serial No. 82,633.

This invention relates to improvements in the treatment of ammoniacal gas liquor from gas plants or coke ovens for the separation of phenols therefrom, whereby the waste liquor can be disposed of without the objections incident to present methods of disposal.

After the treatment of gas liquor for the recovery of ammonia therefrom the waste liquor from the ammonia stills contains impurities, particularly those of a phenolic character, which, even though present in relatively minute amounts, are objectionable in streams or other bodies of water from which drinking water is obtained, particularly if the drinking water is subjected to a chlorination treatment. These objections to still waste liquor are well recognized, with the result that the discharge of such liquor into streams or other bodies of water is in many cases prohibited, and special means or provisions are necessary for the treatment or disposal of the waste liquor, such as pumping the liquor into special collection or treatment basins, or to waste land where it is not a source of contamination of city water supplies.

In our Patent No. 1,566,795 we have disclosed a process for effecting substantially complete removal of phenolic impurities from gas liquors as a part of the ammonia distillation process, such process involving the maintenance of the temperature of the gas liquor in the still at a temperature of about 98° C. or higher with the addition, if necessary, of further amounts of ammonia to the still to promote the removal of phenolic impurities as ammonium phenolate with the ammonia. By maintaining the temperature of the gas liquor in the still sufficiently high, i. e. around 98° C. or higher, and by insuring a sufficient amount of ammonia in the ammonia still, it is possible to effect substantially complete volatilization and removal of phenolic compounds as phenolate with the ammonia so that the waste liquor from the ammonia still is free or substanially free from phenolic impurities.
Where the ammoniacal gas liquor contains an insufficient amount of ammonia, part of the phenolic impurities can be volatilized and removed in a similar way with the ammonia by maintaining the temperature of the gas liquor in the still sufficiently high during the distillation of the ammonia, as described in our prior Patent No. 1,566,796; but in such case more or less of the phenolic impurities remain in the waste liquor and the amount removed and recoverable from the ammoniacal gas liquor is limited to that corresponding to the ammonia content of the liquor. It is possible by increasing the ammonia content, as by adding ammonia or recirculating purified ammonia, to effect substantially complete removal of the phenolic impurities during the distillation; but without such increase in ammonia content, the ammonia normally present in the gas liquor will in many cases be insufficient for such complete removal.

It has also been proposed to treat gas liquors by washing them with benzol to extract and separate phenols therefrom. In order, however, to effect substantially complete removal of phenols in this way it is necessary to have a sufficient number of benzol scrubbers to effect such removal and an increased number of caustic soda washers to free the benzol from the phenol, so that the benzol may be returned to the process. This requires considerable equipment in the way of apparatus and, where substantially all of the phenols are eliminated in this way by benzol extraction, a correspondingly large consumption of caustic soda is required for separating the extracted phenol from the benzol in order that the benzol may be returned to the process.

The present invention provides an improved process in which the ammoniacal gas liquor containing phenolic impurities is subjected to a preliminary partial extraction with benzol for the removal of a part only of the phenolic impurities and in which the resulting ammoniacal gas liquor, thus partially freed from phenolic impurities, is subjected to distillation for the recovery of ammonia therefrom at a sufficiently high temperature so that the remaining phenolic impurities are volatilized and separated from the liquor with the ammonia.

We have found that part of the phenol, e. g. up to around 60 to 65%, can be readily removed from ammoniacal gas liquors by washing the liquor with benzol or similar solvents; and that this partial elimination of phenols can be carried out with simpler equipment and with a considerable reduction in caustic soda consumption as compared with processes where substantially complete elimination of phenols is effected by such benzol extraction. When the ammoniacal gas liquor has thus been partially freed from phenols, the amounts of phenolic impurities are reduced to such an extent that they can be removed with substantial completion in most cases during the distillation of the gas liquor in the ammonia stills for the recovery of ammonia therefrom by maintaining the temperature of the gas liquor in the stills sufficiently high to insure the removal of ammonium phenolate therewith, e. g. at a temperature of around 98° C. or higher. The present process is therefore in the nature of a duplex or two-step process, with partial separation and recovery of phenols from the ammoniacal gas liquor by benzol extraction and with subsequent separation of phenolic impurities during the ammonia distillation. The ammonia distillation can be carried out in the usual ammonia stills, provided the temperature at the outlet is maintained sufficiently high to prevent condensation of ammonium phenolate.

In carrying out the first or preliminary step of the process the ammoniacal gas liquor such as that from gas plants or coke ovens is first passed through a filter to remove insoluble tarry and pitchy carbons which would otherwise tend to contaminate the benzol. The liquor is then subjected to a washing or scrubbing treatment with benzol or other suitable solvent, for example, by using a countercurrent scrubber into which the gas liquor is fed at the top and into which the benzol is injected under pressure near the bottom. The benzol in flowing upwardly countercurrent to the downflowing liquor extracts part of the phenolic impurities therefrom so that the liquor escaping from the washer or scrubber is partially freed from phenolic impurities. The benzol with its dissolved phenols is then treated with caustic soda solution to combine with the phenols and separate them from the benzol so that the benzol can be used over again. This treatment of the benzol with caustic soda may be carried out in countercurrent washers where the phenol-laden benzol flows countercurrent to the caustic soda solution with the result that the phenols combine with the caustic soda to form sodium phenolate and the benzol is freed therefrom. The sodium phenolate solution can then be treated for the recovery of the phenols, e. g., by treatment of acid or sodium bisulfate (nitrate cake), with resulting formation of sodium sulfate and setting free of the phenols or tarry acids.

The gas liquor, after the preliminary scrubbing with benzol, can be passed through a separating chamber to permit separation of the last traces of benzol from the liquor and it is then ready for distillation in the ammonia still. It may be collected in storage tanks that supply the ammonia stills or it may be directly circulated as a part of a continuous process through the benzol scrubbing system and then to the ammonia still.

The ammonia still may for example be such a still as is shown and described in Fig. 1 of our Patent No. 1,566,796. Before entering the still the ammoniacal gas liquor is preheated to around 98° C. or somewhat higher, and is then supplied to the free ammonia still and the gas liquor in the still is maintained at a sufficiently high temperature, that is around 98° C. or higher, thus insuring that the phenolic impurities which are volatile at that temperature will escape with the ammonia.

The operation of the ammonia still is much the same as described in our prior patent. The free ammonia is driven off in the free ammonia still and carries with it phenolic impurities in the form of phenolate. The gas liquor then passes through the lime leg and into the fixed ammonia still where the fixed ammonia is set free and escapes through the free ammonia still, assisting in the formation and carrying off of phenolate.

By extracting a sufficiently large proportion of the phenolic impurities during the preliminary benzol scrubbing, which amount can be readily extracted in that way, the amount of remaining phenolic impurities can be reduced to such a point that the ammonia normally present in the gas liquor will be sufficient to insure substantially complete separation of these remaining impurities during the distillation in the ammonia still and without supplying additional ammonia to the still. The proportion of phenolic impurities which can readily be removed by the preliminary benzol extraction may be up to e. g. 50 to 60% of the amount of such impurities contained in the ammoniacal liquor.

The invention will be further described in connection with the accompanying drawing, which is in the nature of a flow sheet and which shows in a more or less conventional and diagrammatic manner an arrangement of apparatus for carrying out the process.

The crude gas liquor is passed through the filter 1, where insoluble, tarry and pitchy compounds are removed so that the benzol is kept from contamination with such insoluble compounds. From the filter the gas liquor passes to the top of the benzol solvent scrubber 2. This scrubber may be a countercurrent scrubber similar to that used for other purposes where extraction is carried out with an immiscible solvent. Benzol is injected under pressure into the lower part of the scrubber and flows upwardly therethrough countercurrent to the down-flowing ammoniacal liquor. The liquor after this scrubbing treatment passes to the separating tank or decanter 3 where the last traces of benzol are separated. The liquor is now ready to go to the preheater for the ammonia still.

During this scrubbing treatment a considerable part of the phenol is dissolved by the benzol and separated from the ammoniacal liquor so that the liquor escaping has been freed from a considerable part of such impurities.

The benzol, with its dissolved phenols, flows to the caustic washers 10 and 11, through which it passes in series countercurrent to a caustic soda solution supplied from the caustic soda tank 13, the caustic soda solution entering the top of each washer and the benzol solution entering each washer near the bottom and these respective solutions flowing through the washers countercurrent to each other. The caustic soda combines with the phenol forming sodium phenolate and leaving the benzol free or nearly free of phenol so that it can be returned to the scrubber for absorbing further amounts of phenols from the ammoniacal liquor.

The sodium phenolate solution can be drawn off and neutralized with acid or with nitre cake (sodium bisulfate) in the neutralizing tank 14. This tank is provided with a circulating line 15 for circulating and agitating the liquor and nitre cake. From this neutralizing tank the tarry acids and sodium sulfate are drawn off, the tarry acids separating as an oily layer. The sodium sulfate may be run to waste or used for other purposes.

The same benzol can be used repeatedly in a cyclic manner, first for dissolving phenols from the ammoniacal liquor and then to give up the dissolved phenol to the caustic soda solution. Approximately seven and one half gallons of benzol should be kept in circulation for every gallon per hour of gas liquor treated.

The sodium phenolate solution can be recirculated until it reaches the desired strength, when it can be withdrawn from the system and neutralized. Fresh caustic soda is added as required to insure a sufficient amount present in the caustic soda solution used for washing. More or less of the sodium phenolate solution can be recirculated with the caustic soda solution until the phenolate becomes sufficiently strong to withdraw it from the system.

The ammoniacal gas liquor, after its preliminary partial purification from phenols, is either passed to storage and drawn from storage to the ammonia still or it may be passed directly and in a continuous manner to the ammonia still. In the latter case, it is passed through the preheater 5 into the top of the free ammonia still 6. The free ammonia still, with lime leg 8 and fixed ammonia still 9, may be of the construction shown in Fig. 10 of our prior Patent No. 1,566,796, and the still may advantageously have a dephlegmator 7 above the free ammonia still with a return line for returning condensate therefrom to the free ammonia still. The temperature of the dephlegmator is maintained at 98° C. or higher and is intended to condense and return any excess of moisture which may escape from the free ammonia still if maintained at a much higher temperature, e. g. around 104° C.

The operation that takes place in the ammonia still is that described in our prior Patent No. 1,566,796. The ammonia combines with the remaining phenolic impurities to form phenolate and the excess ammonia aids in carrying the phenolate from the still. The phenolate is volatile at temperatures around 98° C. and higher and by preventing the cooling of the escaping gases below such temperature, prevention of condensation of phenolate is effected so that the phenolate escapes in vapor form with the ammonia.

The ammonia with admixed phenolate may pass directly to a saturator or absorber. Where it is desired to recover the phenols they may be recovered by passing the ammonia through an absorber which will separate the phenols from the ammonia and the ammonia can then be recovered in a saturator or otherwise used. The phenolate can, however, be passed directly to the saturator along with the ammonia.

It will thus be seen that the present invention provides an improved process for treating gas liquors in which the liquors are subjected to a preliminary scrubbing with a solvent such as benzol, immiscible in water, which will extract part of the phenolic impurities and that the partially purified liquor is then subjected to distillation in an ammonia still for the recovery of the ammonia therefrom and with regulation of the temperature of distillation so that phenolate vapors will escape from the still with the ammonia. It will also be seen that the invention provides a process which may be carried out in a continuous manner with continuous countercurrent scrubbing of the liquor with the phenol solvent, continuous regeneration of the solvent by washing the phenols therefrom with caustic alkali, and continuous feed of the resulting partially purified liquor to the ammonia still with preheating of the liquor before it enters the still and maintenance of the temperature of the gas liquor in the still sufficiently high, e. g. around 98° C. or higher to effect continuous removal of phenolate vapors with the ammonia.

It will also be seen that by regulating the operations a sufficient proportion of the phenolic impurities, e. g. around 50 to 60%, can be removed by the preliminary benzol extraction so that the remaining portion (e. g. 40 to 50%) can be removed during the ammonia distillation with the amount of ammonia which the gas liquor normally contains and as an incident to the ammonia distillation pro ess, this process however being carried out at sufficiently high temperature to insure that the remainder of the phenolic impurities will be driven off in vapor form. The provision of a preheater for the ammonia still enables the liquor to be sufficiently preheated before entering the still, while the provision of a dephlegmator on the ammonia still enables this still to be maintained at a high temperature, e. g. around 104° C. and enables the excess of water vapor to be condensed and returned while still keeping the escaping vapors sufficiently high to effect removal of the phenolate with the ammonia.

From one aspect the process of the present invention may be considered an improvement on the process of our prior Patent 1,566,796. With gas liquor which does not contain sufficient ammonia to insure that all of the phenolic impurities will be driven off as phenolate with the ammonia, the improved process of the present invention enables a sufficient amount of the phenolic impurities to be removed by the preliminary benzol extraction, so that the remainder can be completely or substantially completely removed during the ammonia distillation with the amount of ammonia which the gas liquor itself contains.

From another viewpoint the process of the present invention may be considered an improvement upon processes of extracting phenolic impurities from gas liquor by means of benzol in that instead of effecting or attempting to effect substantially complete extraction of phenolic impurities in that way, with the additional equipment and soda consumption required, it effects only a partial preliminary separation of phenolic impurities by benzol extraction with simplification of equipment and reduction in caustic soda consumption and effects the further removal of phenolic impurities during the ammonia distillation process by regulation of the temperature of such distillation in the manner hereinbefore described.

We claim:

1. The process of treating gas liquor containing phenolic impurities, which comprises subjecting the liquor to extraction with a solvent for the phenolic impurities to effect partial removal thereof and subsequently subjecting the liquor to distillation for the recovery of ammonia therefrom, the temperature of the liquor and vapors escaping therefrom during the distillation being around 98° C. or higher, so that ammonium phenolate is driven off with the ammonia.

2. The process of treating gas liquor containing phenolic impurities, which comprises subjecting the liquor to countercurrent extraction with benzol to effect partial removal of phenolic impurities, treating the resulting benzol solution with caustic alkali to separate the dissolved phenols from the benzol and treating further amounts of gas liquor with the benzol in a cyclic manner, and subjecting the liquor after such preliminary treatment to distillation for the recovery of ammonia therefrom, the temperature of the liquor and vapors driven off during such distillation being maintained at about 98° C. or higher, so that ammonium phenolate is driven off with the ammonia.

3. The process of treating gas liquor containing phenolic impurities, which comprises subjecting the liquor to extraction with a solvent for the phenolic impurities to effect partial extraction thereof, subsequently subjecting the liquor to distillation for the recovery of ammonia therefrom with maintenance of the temperature of the liquor and vapors from the still during such distillation at about 98° C. or higher, the proportion of phenolic impurities extracted during the preliminary extraction being sufficient so that during the subsequent distillation substantially complete removal of the remaining phenolic impurities will take place.

4. The process of treating gas liquor containing phenolic impurities, which comprises subjecting the liquor to countercurrent extraction with benzol to extract part of the phenolic impurities therefrom, subjecting the resulting benzol containing phenolic impurities to countercurrent scrubbing with caustic alkali solution to separate the phenolic impurities from the benzol, extracting further amounts of gas liquor with the resulting benzol in a cyclic manner, subsequently subjecting the gas liquor to distillation for the recovery of ammonia therefrom with maintenance of the temperature of the liquor and vapors during distillation at about 98° C. or higher to effect separation of phenolic impurities as phenolate with the ammonia, and regulating the preliminary extraction of phenolic impurities with the benzol so that during the subsequent distillation substantially complete removal of the remaining phenolic impurities will be effected.

5. The method of treating gas liquor containing phenolic impurities, which comprises subjecting the liquor in a substantially continuous manner to countercurrent scrubbing with a solvent for the phenolic impurities to effect partial extraction of such impurities, passing the resulting solution in a substantially continuous manner to a preheater and ammonia still and subjecting the liquor to distillation therein for the recovery of ammonia therefrom, the temperature of the liquor and vapors of the still during such distillation being about 98° C. or higher, so that ammonium phenolate will be driven off with the ammonia.

6. The method of treating gas liquor containing phenolic impurities, which comprises filtering the gas liquor to remove insoluble impurities therefrom, then subjecting the liquor to countercurrent scrubbing with benzol to effect partial extraction of phenolic impurities therefrom, effecting substantially complete separation of benzol from the gas liquor, then preheating the gas liquor and subjecting the preheated liquor to distillation for the recovery of ammonia therefrom, the temperature of the liquor and vapors therefrom during the distillation being about 98° C. or higher.

7. The process of treating gas liquor containing phenolic impurities, which comprises subjecting the liquor to extraction with benzol to effect partial removal of phenolic impurities, and subsequently subjecting the liquor to distillation for the recovery of ammonia therefrom, the temperature of the liquor and vapors escaping therefrom during the distillation being around 98° C. or higher so that the ammonium phenolate is driven off with the ammonia.

8. The process of treating gas liquor containing phenolic impurities, which comprises subjecting the liquor to countercurrent extraction with benzol to effect partial removal of phenolic impurities, and subsequently subjecting the liquor to distillation for the recovery of ammonia therefrom, the temperature of the liquor and vapors escaping therefrom during the distillation being around 98° C. or higher, so that ammonium phenolate is driven off with the ammonia.

9. The process of treating gas liquor containing phenolic impurities, which comprises subjecting the liquor to extraction with benzol to effect partial removal of phenolic impurities, treating the resulting benzol solution to separate the dissolved phenols from the benzol and treating further amounts of gas liquor with the benzol in a cyclic manner, and subjecting the liquor after such preliminary treatment to distillation for the recovery of ammonia therefrom, the temperature of the liquor and vapors driven off during such distillation being maintained at about 98° C. or higher, so that ammonium phenolate is driven off with the ammonia.

In testimony whereof we affix our signatures.

LE ROY WILBUR HEFFNER.
WILLIAM TIDDY.